(12) United States Patent
den Boer et al.

(10) Patent No.: US 9,809,275 B2
(45) Date of Patent: Nov. 7, 2017

(54) PEDAL-DRIVEN VEHICLE CRANK

(71) Applicant: Willem den Boer, Brighton, MI (US)

(72) Inventors: Willem den Boer, Brighton, MI (US); Paul R. Metcalfe, Solon, OH (US)

(73) Assignee: Willem den Boer, Brighton, MI (US)

( * ) Notice: Subject to any disclaimer, the term of this patent is extended or adjusted under 35 U.S.C. 154(b) by 0 days.

(21) Appl. No.: 15/046,279

(22) Filed: Feb. 17, 2016

(65) Prior Publication Data
US 2016/0159430 A1   Jun. 9, 2016

Related U.S. Application Data

(63) Continuation-in-part of application No. 13/962,142, filed on Aug. 8, 2013, now Pat. No. 9,403,576.
(Continued)

(51) Int. Cl.
| | |
|---|---|
| *B62M 3/16* | (2006.01) |
| *B62M 1/36* | (2013.01) |
| *G01L 3/02* | (2006.01) |
| *G01L 3/24* | (2006.01) |
| *B62M 3/00* | (2006.01) |
| *B62M 3/06* | (2006.01) |

(52) U.S. Cl.
CPC ............... *B62M 3/16* (2013.01); *B62M 1/36* (2013.01); *B62M 3/00* (2013.01); *B62M 3/06* (2013.01); *G01L 3/02* (2013.01); *G01L 3/24* (2013.01); *Y10T 74/2168* (2015.01)

(58) Field of Classification Search
CPC . B62M 3/00; B62M 3/02; B62M 3/04; B62M 6/50; B62M 3/16; B62M 3/06; B62M 1/36; G01L 3/02; G01L 3/24
See application file for complete search history.

(56) References Cited

U.S. PATENT DOCUMENTS

| | | |
|---|---|---|
| 5,060,536 A | 10/1991 | Boys |
| 5,279,524 A | 1/1994 | Hilber |

(Continued)

FOREIGN PATENT DOCUMENTS

| | | |
|---|---|---|
| DE | 19900680 A1 | 7/2000 |
| FR | 590471 A | 6/1925 |

(Continued)

OTHER PUBLICATIONS

Larsen, B., "Rotor Cranks: Power to the people," CyclingNews Website, Available Online at http://autobus.cyclingnews.com/tech/?id=2002/reviews/rotor_cranks, Available as Early as Jan. 2002, 4 pages.

(Continued)

*Primary Examiner* — Thomas C Diaz
(74) *Attorney, Agent, or Firm* — Alleman Hall Creasman & Tuttle LLP

(57) ABSTRACT

A crank assembly for a pedal-driven vehicle includes a first member, a second member, and a rotary sensor. The first member rotates about a crank axis of the pedal-driven vehicle. The second member is rotationally coupled to the first member and is configured to pivot about the first member via a member pivot. The second member also is configured to receive a pedal at a pedal interface. The rotary sensor is coupled to the first member and configured to measure rotation of the second member relative to the first member.

14 Claims, 5 Drawing Sheets

Related U.S. Application Data

(60) Provisional application No. 62/117,882, filed on Feb. 18, 2015.

(56) References Cited

U.S. PATENT DOCUMENTS

| | | | |
|---|---|---|---|
| 5,611,744 | A | 3/1997 | Shen |
| 5,636,554 | A | 6/1997 | Amey |
| 6,161,452 | A | 12/2000 | Hilber |
| 6,640,662 | B1 | 11/2003 | Baxter |
| 7,806,006 | B2 * | 10/2010 | Phillips ................ G01L 3/1457 280/259 |
| 8,302,505 | B2 * | 11/2012 | Liu ......................... B62M 3/00 74/594.1 |
| 2012/0304810 | A1 | 12/2012 | Butterfield et al. |
| 2013/0019700 | A1 | 1/2013 | Matsumoto |
| 2013/0233092 | A1 * | 9/2013 | Tetsuka ................... B62M 3/16 73/862.621 |
| 2013/0255089 | A1 | 10/2013 | Brosz et al. |
| 2014/0041480 | A1 | 2/2014 | den Boer |

FOREIGN PATENT DOCUMENTS

| | | |
|---|---|---|
| FR | 891873 A | 3/1944 |
| FR | 2608991 A2 | 7/1988 |

OTHER PUBLICATIONS

Bertucci, W. et al., "Effects on the crank torque profile when changing pedalling cadence in level ground and uphill road cycling," Journal of Biomechanics, vol. 38, No. 5, May 2005, 8 pages.

Rasmussen, J. et al., "Ergonomic optimization of a spring-loaded bicycle crank," 6th World Congress of Structural and Multidisciplinary Optimization, May 30, 2005, Rio de Janeiro, Brazil, 8 pages.

Johnstone, D., "Torque effectiveness and pedal smoothness," Cycling Analytics Website, Available Online at https://www.cyclinganalytics.com/blog/2014/04/torque-effectiveness-and-pedal-smoothness, Apr. 11, 2014, 6 pages.

U.S., Office Action Issued in Patent Application No. 13/962,142, dated Oct. 28, 2015, 13 pages.

ISA Korean Intellectual Property Office, International Search Report and Written Opinion Issued in Application No. PCT/US2016/018309, dated May 11, 2016, WIPO, 13 pages.

\* cited by examiner

PEDAL-DRIVEN VEHICLE CRANK

CROSS REFERENCE TO RELATED APPLICATIONS

This application claims priority to U.S. Provisional Patent Application No. 62/117,882, filed Feb. 18, 2015, and is a continuation-in-part from U.S. patent application Ser. No. 13/962,142, filed Aug. 8, 2013, the entirety of each of which are hereby incorporated herein by reference.

BACKGROUND

When operating a pedal-driven vehicle, riders may desire feedback regarding their expenditure of energy and the resulting performance of the vehicle. Pedaling information such as power, torque, and angular velocity, for example, may apprise riders of their fitness level and facilitate improvement in pedaling efficiency and/or technique. To this end, power meters have been developed for use in bicycles and other pedal-driven vehicles that collect and report pedaling data.

SUMMARY

A crank assembly for a pedal-driven vehicle includes a first member, a second member, and a rotary sensor. The first member rotates about a crank axis of the pedal-driven vehicle. The second member is rotationally coupled to the first member and is configured to pivot about the first member via a member pivot. The second member also is configured to receive a pedal at a pedal interface. The rotary sensor is coupled to the first member and configured to measure rotation of the second member relative to the first member.

DETAILED DESCRIPTION

As described above, riders of a pedal-driven vehicle may desire information regarding their expenditure of energy and the resulting performance of the vehicle. Pedaling information such as power output, pedal torque, and pedal speed, for example, may apprise riders of their fitness level and facilitate the optimization of pedaling efficiency and/or technique. To this end, a power meter may be used to collect and report pedaling data to a rider.

Figure 1:
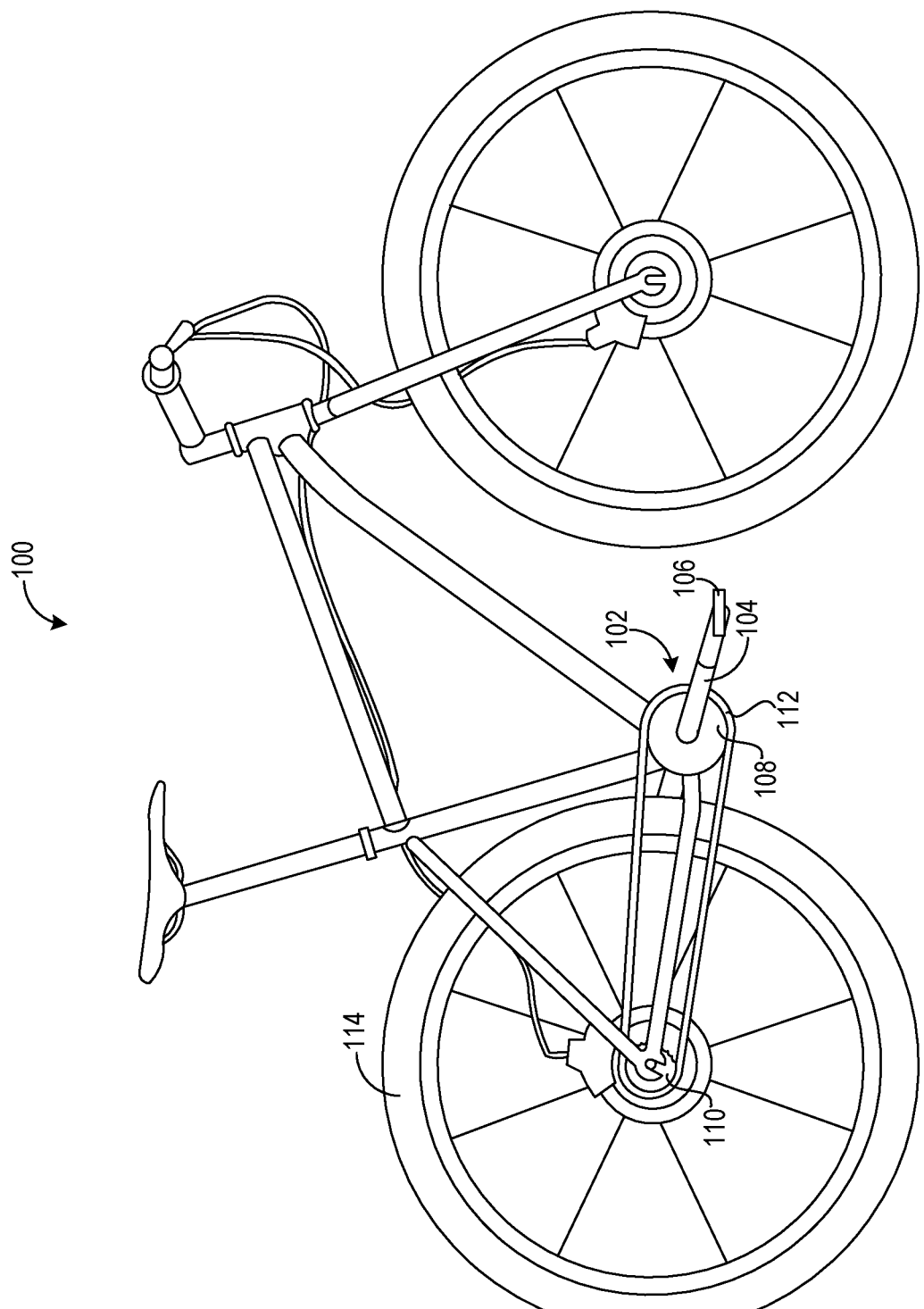
FIG. 1 shows an example pedal-driven vehicle in the form of a bicycle.

FIG. 1 shows an example pedal-driven vehicle 100 in the form of a bicycle. Pedal-driven vehicle 100 may assume any suitable form, however, including but not limited to that of a unicycle, tricycle, quadricycle, rickshaw cycle, pedal-driven boat, pedal-driven aircraft, etc.

Pedal-driven vehicle 100 may facilitate the conversion of pedaling motion provided by a rider to translational motion of the vehicle in known manners. For example, vehicle 100 may include a crank assembly 102 having a crank arm 104 to which a pedal 106 may be coupled. A rider of vehicle 100 may impart force to pedal 106, which results in the application of torque to crank arm 104. The application of torque to crank arm 104 in turn may cause a chain ring 108 to rotate, where the rotation of the chain ring may be imparted to a cogset 110 via a chain 112. Motion of cogset 110 may then be imparted to a rear wheel 114 of vehicle 100 to thereby drive the vehicle and enable translational motion.

Various operational aspects of pedal-driven vehicle 100 may be measured and used to provide feedback to a rider of the vehicle. To this end, one or more sensors may be coupled to crank arm 104. As described in further detail below, a rotary sensor and/or torque sensor may be used to provide a rider with measurements of the angular speed or velocity of pedal 106, power generated at crank arm 104, torque applied to the pedal, and/or other quantities. As also described in further detail below, a transceiver may be used to send such measurements to a suitable output device where the measurements, or information derived from the measurements, may be conveyed to a rider of vehicle 100. The output device may be, for example, a display device, a speaker, a tactile feedback device, a smartphone, a head unit, etc.

Although a single crank arm is featured in FIG. 1, pedal-driven vehicle 100 also includes a second crank arm. The second crank arm may have similar functional characteristics and geometry as crank arm 104. The second crank arm may be positioned at 180° with respect to crank arm 104, for example, though other relative arrangements of the first and second crank arms are contemplated. Moreover, the crank arms may be positioned on opposing sides of vehicle 100, and the crank arms may be referred to as left and right crank arms. Pedaling data may be provided separately for each crank arm, averaged between the crank arms, etc.

Figure 2A:
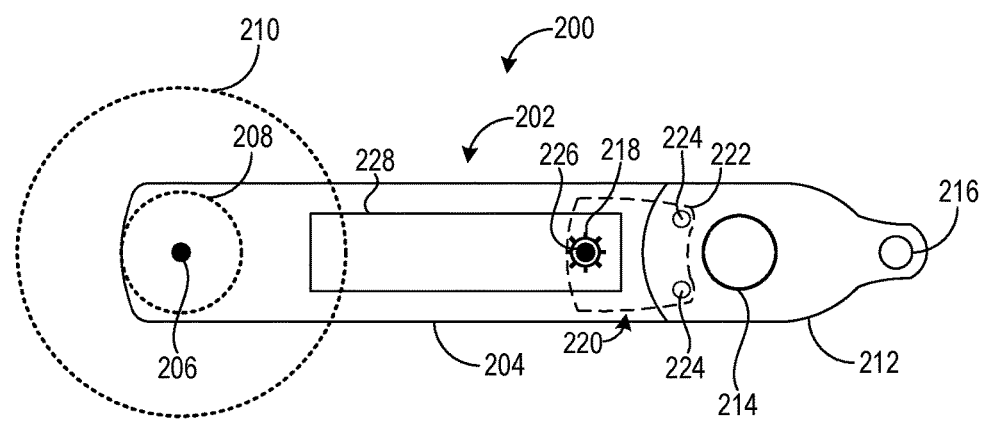
FIGS. 2A-2C each show one or more respective states of an example crank assembly including a crank arm.
Figure 2B:
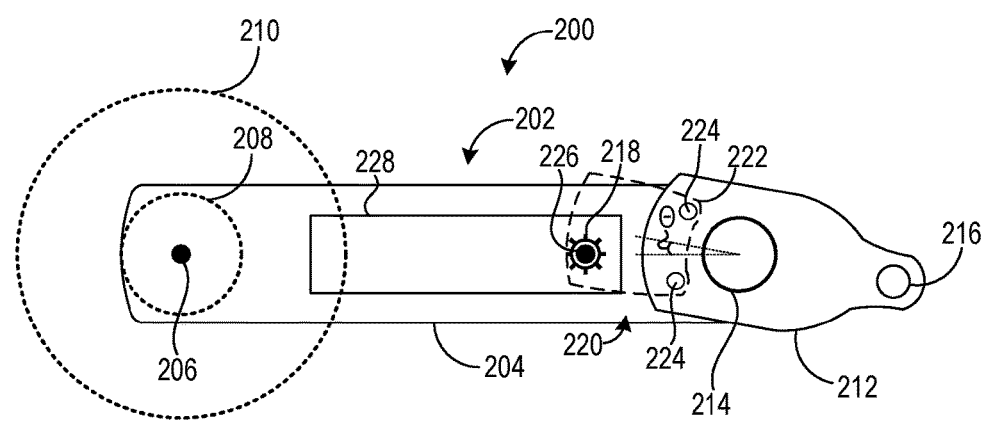

FIGS. 2A and 2B show respective states of an example crank assembly 200 including a crank arm 202. Crank arm 202 may be crank arm 104 of FIG. 1 and/or the second crank arm included in pedal-driven vehicle 100, for example.

Crank arm 202 may include a first member 204 that rotates about a crank axis 206 (e.g., of pedal-driven vehicle 100 of FIG. 1). Crank axis 206 may extend (e.g., in a direction into the page of FIGS. 2A and 2B) at least partially through a hollow crank axle 208, which is shown in dashed lines in FIGS. 2A and 2B. Crank axle 208 may pass through a chain ring 210, also shown in dashed lines, to a second crank arm. In some examples, one or more of crank axis 206, crank axle 208, and chain ring 210 may be substantially coaxial. As described in further detail with reference to FIG. 5, crank axle 208 may provide a space through which electrical conductors that carry power and/or data may be pathed. In some embodiments, a bolt that connects the left and right crank arm may include a wiring path (e.g., a hollow shaft) so that electrical components in the left and right crank arms can be communicatively coupled.

Crank arm 202 may further include a second member 212 rotationally coupled to first member 204 and configured to pivot clockwise and counterclockwise about the first member via a member pivot 214. Member pivot 214 may include any suitable mechanism for enabling pivoting motion of second member 212 about first member 204—e.g., the member pivot may include a bearing mechanism. Second member 212 may also be configured to receive a pedal (e.g., pedal 106 of FIG. 1) at a pedal interface 216, which may include various suitable mechanisms (e.g., threaded bore) for enabling the removable attachment of pedals thereto.

A spring or other mechanism may be used to bias first member 204 and second member 212 in a default orientation (e.g., 0°). Pedaling force may overcome the biasing of the spring, thus storing energy in the spring for at least a portion of a pedal stroke. The stored energy may be released during another portion of the pedal stroke. Any suitable spring or other energy storage device may be used. It is believed that storing and releasing potential energy via the spring or other mechanism reduces (e.g., substantially eliminates) the dead spots during crank strokes and provides a more even torque on a drive wheel. As a result, the onset of rider fatigue may be delayed and/or the power output and speed of the pedal-driven vehicle may be increased. Furthermore, traction of a drive wheel mechanically coupled to the crank arm may be increased when the dead spots are attenuated.

Figure 2C:
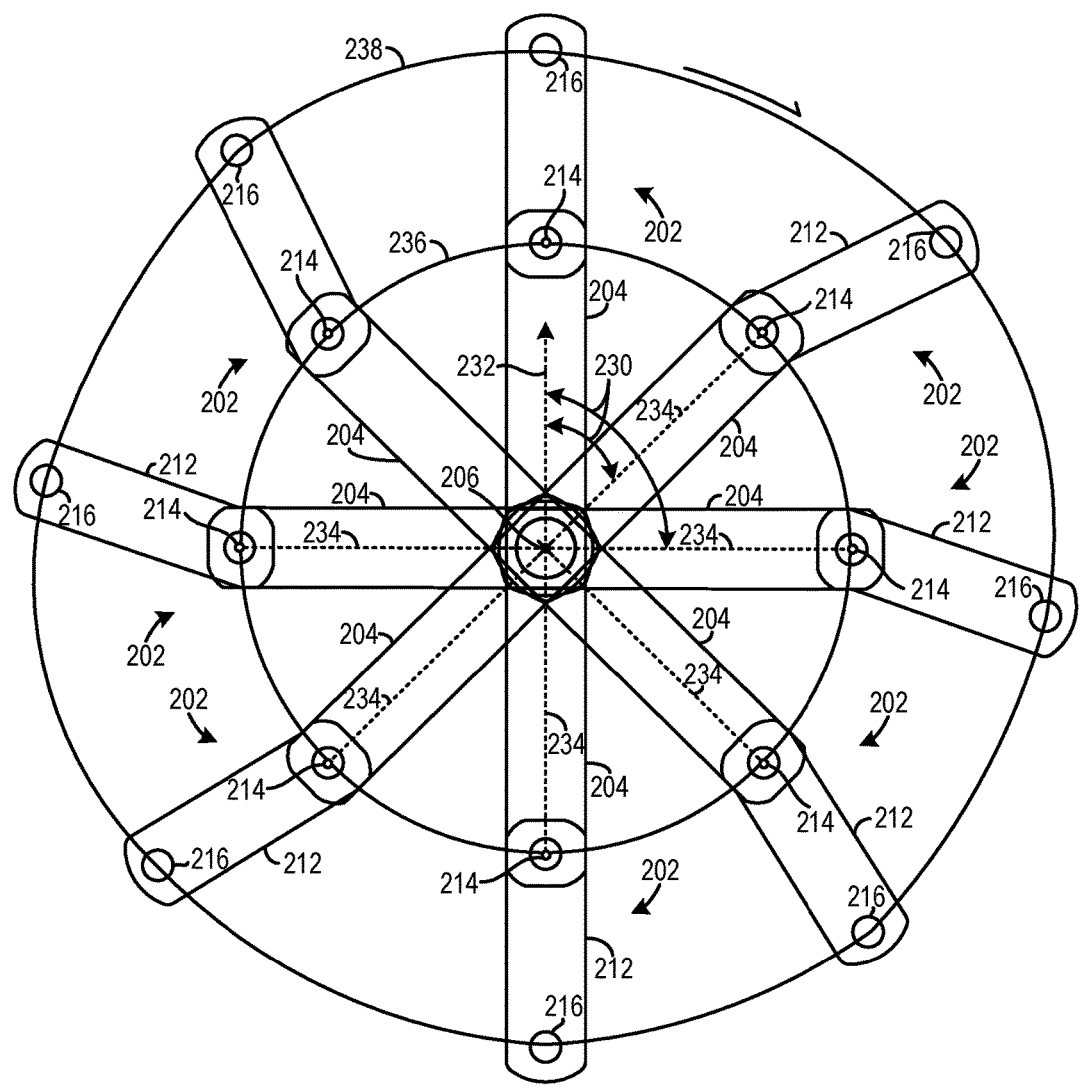

FIG. 2C shows crank arm 202 in simplified form being rotated clockwise about crank axis 206, for example via pedal input from a rider.

A number of positions of crank arm 202 are simultaneously illustrated to depict the path of the crank arm throughout a crank stroke. An angle 230 of the various positions of crank arm 202 in the crank stroke may be measured from a vertical axis 232 extending from crank axis 206 to a line 234 extending from the crank axis to member pivot 214. Thus, angle 230 measures the rotation of first member 204 with regard to vertical axis 232. It will be appreciated that vertical axis 232 may be parallel to a gravitational axis.

The crank stroke may be conceptually divided into an upward crank stroke and a downward crank stroke. The downward crank stroke may correspond to the rotational range of first member 204 from a 0° angle to a 180° angle in a clockwise direction. On the other hand, the upward crank stroke may correspond to the rotational range of first member 204 from a 180° angle to a 360° angle in a clockwise direction.

As described above, a spring or other mechanism may be configured to store and release energy during both the downward crank stroke as well as the upward crank stroke. For instance, when the angle 230 is 90°, second member 212 is rotated away from the neutral rotation configuration and therefore stores potential energy. At the bottom of the crank stroke when the angle 230 is 180°, most or all of the energy stored in the spring assembly was released in a preceding portion of the stroke, and therefore the spring assembly is storing little or no potential energy at the bottom of the crank stroke. This release of potential energy increases the amount of torque applied by crank arm 202 near the bottom of the crank stroke. As a result, the magnitude of one of the valleys (e.g., so-called "dead spots") in the crank arm's torque curve is reduced.

Specifically, when angle 230 of crank arm 202 is close to 180° and 360° (e.g., 6 o'clock and 12 o'clock), the potential energy in the spring assembly is released. When angle 230 is 180°, any force on the pedal becomes perpendicular to the compression direction of the spring, allowing the spring to decompress. At this time the springs are oriented horizontally, so that the energy is released in the rotation direction, increasing the torque.

Additionally, in the example depicted in FIG. 2C, a rider is exerting an upward force on pedal interface 216 during the upward crank stroke. Therefore, it will be appreciated that the pedal coupled to pedal interface 216 may include toe clips, clipless pedals, and/or other suitable devices configured to enable a user to impart an upward force on second member 212 throughout the upward crank stroke. However, in other examples downward force may be exerted during the upward crank stroke. In this case the return stop prevents the spring assembly from storing counterproductive potential energy. When angle 230 is 270° second member 212 is again rotated away from the neutral rotation configuration and stores energy. This energy is released through a subsequent portion of the crank stroke, and when angle 230 is 360° most or all of the energy was previously released. In this way, the magnitude of another valley in the crank arm's torque curve is reduced, providing a more even torque curve throughout the crank stroke. This type of torque curve is believed to increase traction of a drive wheel mechanically coupled to the crank arm and may increase the power output and/or speed of the pedal-driven vehicle and/or delay the onset of rider fatigue.

Further, the distance between crank axis 206 and member pivot 214 is less than the distance between the crank axis and pedal interface 216 throughout the downward and upward crank strokes, in the embodiment depicted in FIG. 2C. However, other rotational characteristics of crank arm 202 are contemplated.

A path 236 of member pivot 214 is also shown in FIG. 2C. The path is substantially circular. Additionally, a path 238 of pedal interface 216 is shown. The path of pedal interface 216 is not circular due to decreasing distance between the pedal interface and crank axis 206 when second member 212 is in a non-neutral configuration.

Operational attributes of crank arm 202 may be measured to provide at least some of the pedaling data described above in a pedal-driven vehicle incorporating the crank arm. To this end, crank arm 202 may include a sensor gear 218. Sensor gear 218 may form part of a rotary sensor, for example. In the depicted example, sensor gear 218 is configured such that pivoting motion of second member 212 relative to first member 204 actuates the sensor gear, which may enable derivation of at least some of the pedaling data described above.

Unlike conventional crank arms, crank arm 202 includes a member pivot 214 and a rotary sensor. Numerous pivot configurations and numerous rotary sensor implementations are envisaged. For example, a potentiometer or a Hall effect sensor may be used. In some implementations, the rotary sensor may be concentric with the member pivot point, while in other implementations, such as those illustrated in FIGS. 2A and 2B, the rotary sensor and the member pivot may be eccentric. The embodiments disclosed herein are in no way limiting. Other types of rotary sensors and/or other pivot configurations are also capable of smoothing dead spots while providing pedaling data.

In the example illustrated in FIGS. 2A and 2B, crank assembly 200 may include an arc gear 220 configured to cause rotation of sensor gear 218 responsive to second member 212 rotating relative to first member 204. Arc gear 220 may include a shield 222, shown in dashed lines in FIGS. 2A and 2B, that covers sensor gear 218 and thereby protects the gear from debris and the elements to preserve sensing functionality. FIGS. 2A and 2B show the shield coupled to second member 212 via screws 224 although other connection mechanisms are envisaged. In some embodiments, the arc gear 220 may be an integral component of second member 212.

A potential drawback with other contemplated power meter designs is the sensing inaccuracy resulting from use of only a limited range of a sensor—e.g., a limited angular range of a rotary sensor. To address this drawback and increase the accuracy of pedaling data collection for crank arm 202, rotation of sensor gear 218 may be mechanically amplified by arc gear 220. To illustrate this configuration, FIG. 2B shows second member 212 rotated relative to first member 204 by an angle Θ (e.g., 10°). Angle Θ may be the angle between the respective longitudinal axes of first and second members 204 and 212, for example. FIG. 2B may represent a state of crank arm 202 in which pedaling force provided by a user pivots second member 212 relative to first member 204, for example. This state of crank arm 202 may contrast with the state of the crank arm depicted in FIG. 2A, which may correspond to a state in which a rider is not providing pedaling force, and second member 212 is substantially aligned with first member 204 (e.g., Θ is approximately 0°), for example.

Figure 3A:
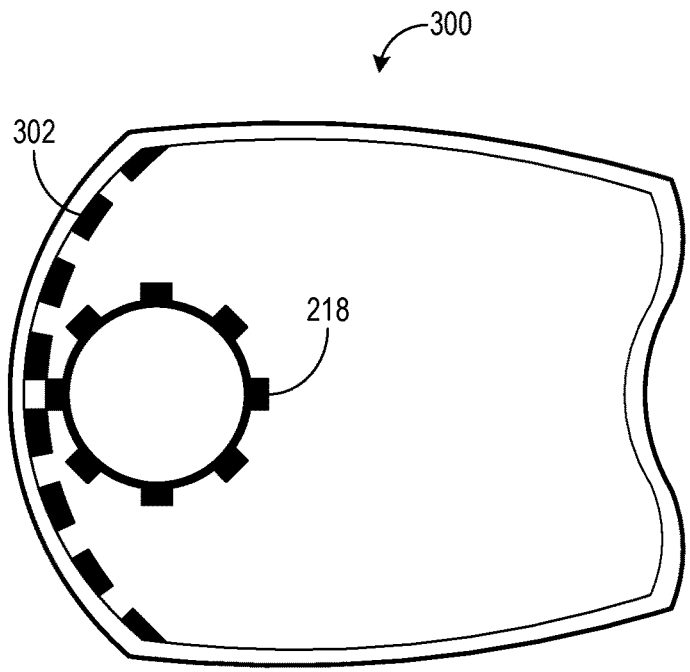
FIGS. 3A and 3B show respective states of an example gear assembly.
Figure 3B:
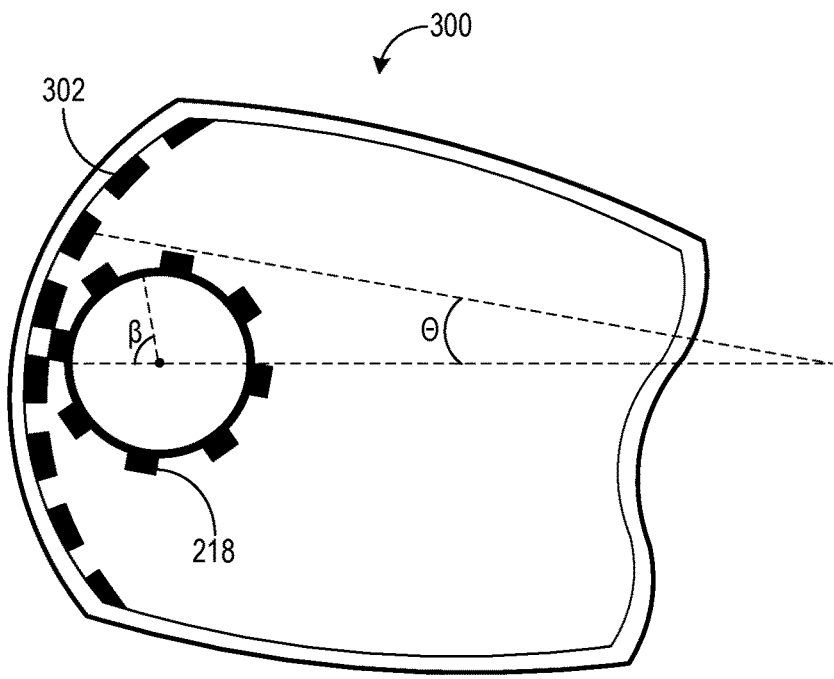

To further illustrate the potential mechanical amplification afforded by arc gear 220, FIGS. 3A and 3B somewhat schematically show respective states of an example gear assembly 300 comprising sensor gear 218 and arc gear 220. FIGS. 3A and 3B depict, for example, the underside of arc gear 220 and sensor gear 218, and show the state of gear assembly 300 corresponding to the relative orientation of first member 204 and second member 212 shown in FIG. 2A, and to the relative orientation shown in FIG. 2B, respectively.

In FIG. 3A, sensor gear 218 may be in a substantially non-rotated (e.g., 0°) orientation relative to arc gear 220, as second member 212 is substantially non-rotated relative to first member 204. Conversely, in FIG. 3B sensor gear 218 may be rotated through an angle β as a result of the rotation of second member 212 through angle Θ relative to first member 204. Due to the mechanical amplification provided by arc gear 220 when teeth 302 of the arc gear engage sensor gear 218, angle β may be larger than angle Θ so that a greater range of the sensor gear is utilized. As a non-limiting example, angle Θ may be 10° while angle β may be 80°, in which case arc gear 220 may provide a mechanical amplification factor of 8. Other suitable amplification factors may be employed, however.

Returning to FIGS. 2A and 2B, arc gear 220 may engage sensor gear 218 between an axle 226 about which the sensor gear rotates, and crank axis 206. Teeth 302 (FIGS. 3A and 3B) of arc gear 220, for example, may engage sensor gear 218 between these points. Sensor gear 218 may be positioned outside an enclosure 228 included in first member 204, which may be substantially sealed to protect components positioned therein from debris and the elements. In such a configuration, sensor gear 218 may be operatively coupled to a sensing element (not shown in FIGS. 2A and 2B) positioned inside enclosure 228 such that actuation of the sensor gear causes actuation of the sensing element, thereby generating readings that can be used to derive pedaling data. In this way, enclosure 228 may enable actuation of sensor gear 218 by arc gear 220 while protecting the sensing element from degradation.

Figure 4:
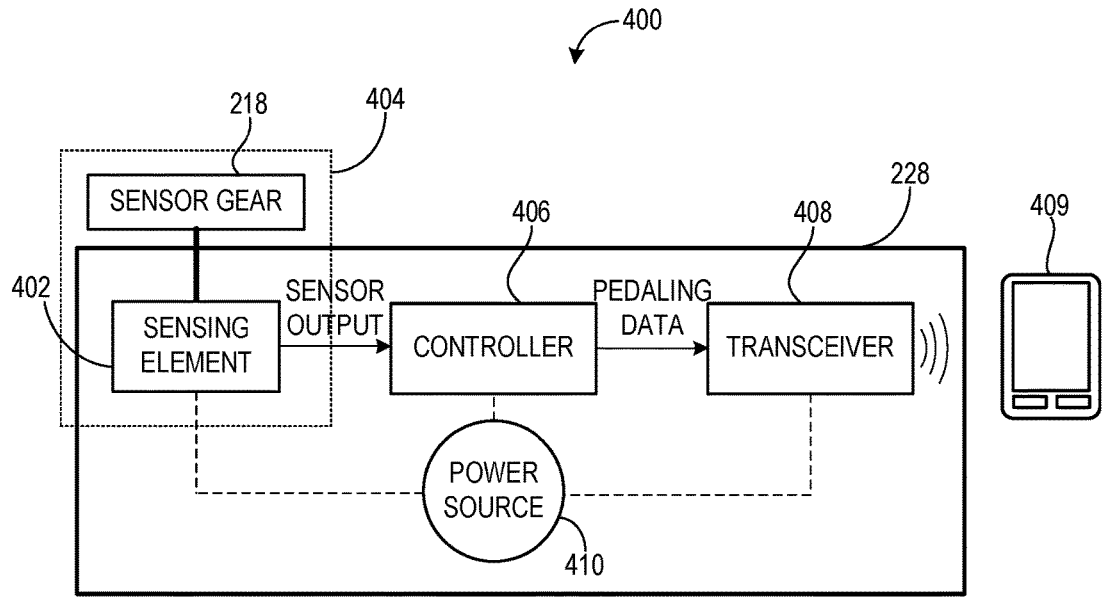
FIG. 4 schematically depicts an example sensor assembly.

Enclosure 228 may employ a removable cover to enable access to components positioned therein. The removable cover may be installed and/or removed by bolts, screws, or any other suitable mechanism, and may employ a suitable mechanism such as a gasket for preventing the entry of debris into the enclosure. As shown in FIG. 4, sensor gear 218 may be physically coupled to a sensing element positioned in enclosure 228 via an axle which is routed through an opening in the enclosure. The opening may be substantially sealed to allow the axle to pass through the opening while preventing the entry of debris into enclosure 228 through the opening. Alternative configurations are contemplated in which sensor gear 218 is communicatively coupled to the sensing element via a suitable wireless connection (e.g., via inductive or capacitive coupling).

As described above, crank arm 202 may be one of two crank arms provided in a pedal-driven vehicle (e.g., vehicle 100 of FIG. 1), with at least some sensing functionality provided in the other of the crank arms. In such implementations, and while not shown in FIGS. 2A and 2B, crank assembly 200 may further include a third member that rotates about crank axis 206 of the pedal-driven vehicle, and a fourth member rotationally coupled to the third member and configured to pivot about the third member via a member pivot, with the fourth member being configured to receive a pedal at a pedal interface. Further, crank assembly 200 may include, in addition to sensor gear 218 and arc gear 220, a second (e.g., rotary) sensor coupled to the third member and a second arc gear coupled to the fourth member.

FIG. 4 schematically depicts an example sensor assembly 400. Sensor assembly 400 may be used to collect and report pedaling data in pedal-driven vehicle 100 of FIG. 1, for example. Assembly 400 may include enclosure 228 incorporated in crank arm 202 of FIGS. 2A and 2B. Assembly 400 may also include sensor gear 218, whose operative coupling to a sensing element 402 is depicted. Sensing element 402 may assume any suitable form such as that of a resistive sensor or potentiometer, for example. Due to the rotational actuation of sensor gear 218, the sensor gear and sensing element 402 may be designated as a rotary sensor 404. Alternative sensor configurations are possible, however, including those that use a torque sensor, which may or may not be a rotary sensor.

Rotation of sensor gear 218 may be used to derive various pedaling data quantities in any suitable manner. Such quantities may include but are not limited to crank arm angular velocity/acceleration, crank assembly torque, average or instantaneous output power, left/right torque or power balance, etc. Since the rotation of sensor gear 218 may be proportional to the motion of a corresponding crank arm (e.g., via its physical coupling thereto), knowledge of physical properties of the crank arm (length, gear ratio of an arc gear, spring force, etc.) may enable accurate calculation of the pedaling data quantities described herein.

Sensor assembly 400 may include a controller 406 positioned inside enclosure 228 and communicatively coupled to rotary sensor 404. Controller 406 may be configured to provide output derived from rotary sensor output. As such, FIG. 4 shows sensor output from sensing element 402 fed to controller 406. Sensor output may be processed by controller 406 in various suitable manners to derive one or more pedaling data quantities. In some examples, controller 406 may receive sensor output for two or more crank arms, in which case pedaling data may be derived for each crank arm or averaged among the two or more crank arms. As an example, controller 406 may be communicatively coupled to first and second sensors (e.g., respectively provided in first and second crank arms), and may be configured to derive an angular velocity of the first and second crank arms from measurements of the first and second sensors. Alternatively or additionally, controller 406 may be configured to output at least one torque of the first and second crank arms from torque measurements of one or both of first and second sensors. As another example, controller 406 may derive the angular velocity or speed of a crank assembly from the total torque of two crank arms (e.g., computed by summing individual torque readings of the first and second crank arms). The total torque may have a frequency corresponding to twice the angular velocity (e.g., in revolutions per minute), enabling easy computation of the angular velocity. Such an approach may enable angular velocity sensing without accelerometers and/or gyroscopes. As described in further detail below, controller 406 may perform pedaling data processing to a varying extent—e.g., the controller may provide precursor (e.g., raw) pedaling data to a calculation device which derives pedaling data quantities from the precursor pedaling data, or may itself determine pedaling data quantities, which may be reported to riders, for example.

Sensor assembly 400 may include a wireless transceiver 408 positioned inside enclosure 228. As shown in FIG. 4, transceiver 408 may be communicatively coupled to controller 406 to enable the reporting of raw pedaling data and/or pedaling data derived by the controller. Transceiver 408 may transmit pedaling data to any suitable computing and/or output device (e.g., smartphone or cockpit computer, external or peripheral computing device). Transceiver 408 may be integrated with or may be separate from controller 406. The transceiver may utilize any suitable communication protocol (e.g., low energy Bluetooth and/or ANT+). Using a low energy antenna can reduce power consumption in the computing system, thereby increasing system efficiency, for example.

Controller 406 may be configured to perform on-controller calculations and/or to transmit precursor information to an external computing device (e.g., a smartphone or a computer mounted in the vehicle cockpit) for off-controller calculations. To this end, FIG. 4 shows a calculation device 409 that may be operable to receive output from transceiver 408. In both scenarios, the calculation device (e.g., controller, smartphone or other mobile device, head unit, or other external/peripheral computer) may be programmed to calculate any suitable pedaling parameter based on the specific crank arm implementation.

When a smartphone is used as calculation device 409, for example, the cost of the system can be reduced due to the fact that the computing power of a rider's existing mobile device is leveraged. However, numerous suitable calculation devices have been contemplated such as smartwatches, tablets, laptops, a dedicated pedal-driven computing device, etc. Therefore, it will be appreciated that any data generation functionality can be provided in the form of a mobile application.

Calculation device 409 includes memory and a processor. It will be appreciated that various functionalities corresponding to the calculation device discussed herein may be stored as code in the memory executable by the processor.

Calculation device 409 is configured to generate various pedal-driven vehicle data based on the digital signals provided by the controller. The pedal-driven vehicle data includes data corresponding to the crank arm sensors such as power (e.g., average power and instantaneous power), left/right power balance, left/right torque effectiveness, left/right pedaling smoothness, and left/right torque profile. Additional data which can be generated by the calculation device includes calories burned, speed, trip distance, elapsed time, elevation gain, temperature, and cadence. Measuring the power in this way enables the rider to know how much power is transferred from their legs to the pedal-driven vehicle powertrain. Moreover, the wealth of data generated by the calculation device from the sensor inputs allows the rider to keep track of progress, training schedules, and to improve riding style. It will be appreciated that the aforementioned data may be presented in the form of graphical plots to a rider.

For implementations in which a spring or other mechanism is used to store energy in crank arm 202 (e.g., in the configuration described above with reference to FIG. 2C), energy stored in the spring by the rotation of the crank arm may be determined using the following equation:

$$E = \tfrac{1}{2}k\Theta^2,$$

The torque (in Nm) on the first member is given by (for torque perpendicular to the second member):

$$\tau = k\Theta \cos\Theta,$$

k is the torsion spring constant (in Nm/radians) and $\Theta$ is the deflection angle in radians.

Power (in Watts) may be given by:

$$P = \tau\omega = \omega k\Theta \cos\Theta$$

where $\omega$ is the angular speed (in radians/sec). P, $\tau$, and $\omega$ will normally all vary with time, within one revolution and over longer time frames. $\tau$ is the sum of the torques in the left and right crank arms.

The angular speed $\omega$ is related to the cadence in rpm (in revolutions/minute) by:

$$\text{rpm} = 60\omega/2\pi$$

Torque Effectiveness (TE) and Pedaling Smoothness (PS may be defined as:

$$TE = (P^+ P^-)/P^+$$

$P^+$ is the power pushing the pedal forward, producing positive torque, and $P^-$ is the power in the opposite direction and is negative or zero.

$$PS = P_{ave}/P_{max}$$

$P_{ave}$ is the average power applied to the pedal during a full stroke and $P_{max}$ is the maximum power applied to the pedal during the stroke.

Furthermore, the angular velocity and torque of the crank are normally time dependent, from one revolution to the next and within one revolution. Therefore, the following equations may be used to calculate power and torque of the crank.

$$P(t) = \omega(t)\tau_{total}(t)$$

$$\tau_{total}(t) = \tau_L(t) + \tau_R(t)$$

It will be appreciated that the equations for torque, energy power, and torque effectiveness may be used by calculation device 409 to generate the pedal-driven vehicle data. Measuring the power in this way enables the rider to know how much power is transferred from their legs to the pedal-driven vehicle powertrain to improve riding.

Springs constants of the spring in the spring assembly may change over time. Therefore, a factory calibration of controller 406 and/or calculation device 409 may not provide long term accuracy of the data generated by computing system. Therefore, the controller and/or calculation device may be configured for periodic calibration. System calibration is discussed in terms of a vehicle with two crank arms arranged at 180° with respect to one another. However, it will be appreciated that the calibration of vehicles with alternate crank arm arrangements has been contemplated. In one example, the system may be calibrated using a rider's weight, when it is accurately known. Thus, a user may enter their weight into the calculation device. Initially, the rider can stand on the pedals of the pedal-driven vehicle with their full weight. When the rider stands on the pedals in this way the system is substantially balanced. The forward pedal sees a positive, productive torque corresponding to approximately half the rider's weight. The backward pedal sees a negative, counterproductive torque, corresponding to half the rider's weight, canceling out the positive torque. Therefore, when the rider stands on the pedals without rotation of the pedals, the angular velocity of the crank arms and total toque is zero, expressed by the following equations.

$$\tau_L + \tau_R = 0$$

$\tau_L$ is the torque in the left crank and $\tau_R$ is the torque in the right crank, so that $$k_L\Theta_L + k_R\Theta_R = 0$$

$k_L$ and $k_R$ are the torsion spring constants for the left and right crank arms, respectively, and $\Theta_L$, and $\Theta_R$ are the left and right deflection angles, respectively, under the weight of the cyclist. In other words, with the left foot forward, half of the rider's weight produces positive torque ($\Theta_L$ positive) on the left crank, and the other half produces negative torque ($\Theta_R$ negative) on the right crank, cancelling out the total torque. The springs can rotate in both positive and negative direction. The spring deflection of both crank arms is then recorded while the rider stands on the pedals. This procedure can then be repeated after the crank arms are rotated by 180°, such that each crank arm sees a substantially opposing torque. Calculation device 409 may then be configured to determine the effective spring constants for left and right crank from these measurements. In this way, the spring constants can be updated during use of the computing system, in case the spring constant has changed over time. It will be appreciated that the accuracy of the calibration is proportional to the accuracy of the rider's weight at the time of calibration. In some implementations, data can be corrected for the temperature coefficient of the resistance in a sensor (e.g., rotary sensor calibrated for different spring resistances at different temperatures). Accordingly, a temperature sensor may be utilized for real time temperature calculations.

Sensor assembly 400 may include a power source 410 positioned inside enclosure 228. Power source 410 may be configured to provide power to one or more of sensing element 402, controller 406, and wireless transceiver 408. Power source 410 may assume any suitable form, such as that of a coin battery, for example.

Figure 5:
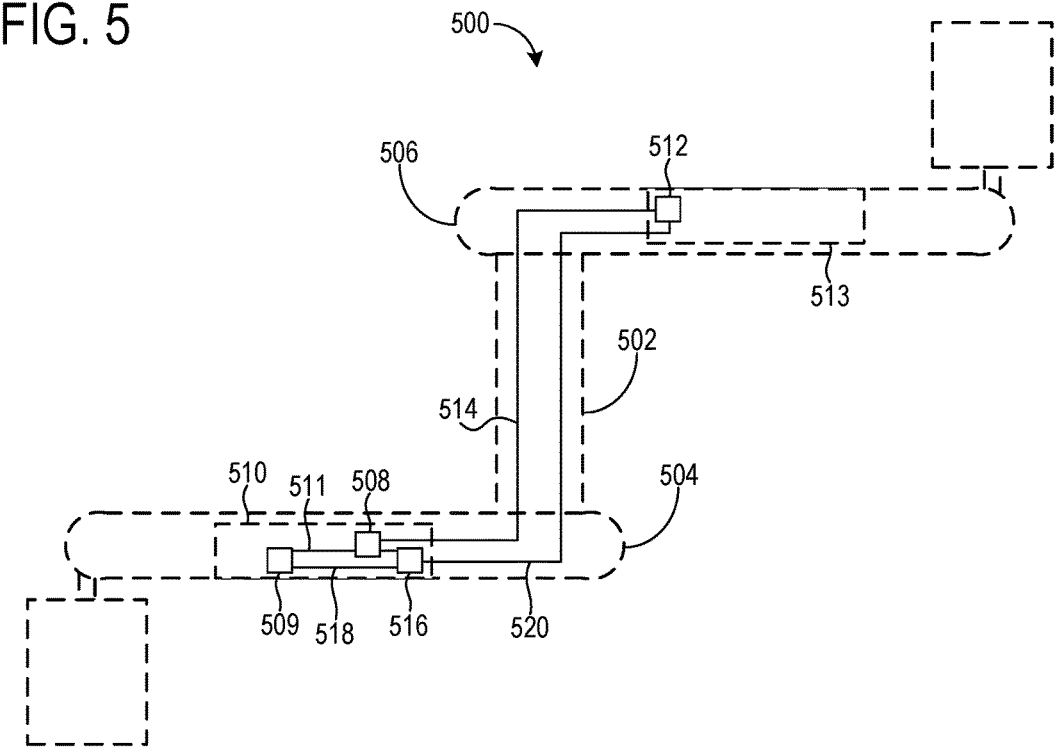
FIG. 5 shows an example crank assembly including a hollow crank axle.

FIG. 5 schematically shows an example crank assembly 500 including a hollow crank axle 502. A first crank arm 504 and a second crank arm 506 may be coupled to crank axle 502, one of which may be crank arm 202 of FIGS. 2A and 2B, for example. FIG. 5 also shows a controller 508 (e.g., controller 406 of FIG. 4) and a torque sensor 509 coupled to first crank arm 504 in an enclosure 510, with a first electrical conductor 511 communicatively coupling the controller to the first torque sensor. Continuing with FIG. 5, a second torque sensor 512 may be coupled to second crank arm 506 in an enclosure 513, and a second electrical conductor 514 may communicatively couple controller 508 to the second torque sensor. Second electrical conductor 514 may be pathed through hollow crank axle 502 or another suitable path, such as a hollow bolt connecting the left and right crank arms. A power source 516 (e.g., power source 410 of FIG. 4) may be coupled to first crank arm 504 in enclosure 510 and configured to supply power to first and second torque sensors 509 and 512 and to controller 508. A third electrical conductor 518 may operatively couple power source 516 to first torque sensor 509, and a fourth electrical conductor 520 may operatively couple the power source to second torque sensor 512. Fourth electrical conductor 520 may be pathed through hollow crank axle 502 or another suitable path. In some implementations, the metal of the crank set can serve as ground, and two wires may be pathed between the left and right crank arms—one for a 3V connection to a variable resistor and one to a wiper of the resistor.

As shown in FIG. 5, duplicate components (e.g., controllers and power sources) may be eliminated. Particularly, in crank assembly 500, a controller and power source that might otherwise be coupled to second crank arm 506 can be omitted by coupling second torque sensor 512 to controller 508 and power source 516. In this way, cost, complexity, and potential sources of degradation can be reduced. In some implementations, the transmission of power and data may be provided on a common electrical conductor, in which case first and third electrical conductors 511 and 518 may be combined, and second and fourth electrical conductors 514 and 520 may be combined.

The crank arms introduced above are only examples within the scope of this disclosure.

Finally, it will be understood that the articles and systems described hereinabove are non-limiting examples for which numerous variations and extensions are contemplated. Accordingly, this disclosure includes all novel and non-obvious combinations and sub-combinations of the articles and systems disclosed herein, as well as any and all equivalents thereof.

The invention claimed is:

1. A crank assembly for a pedal-driven vehicle, comprising:
   a first member that rotates about a crank axis of the pedal-driven vehicle;
   a second member rotationally coupled to the first member and configured to pivot clockwise and counterclockwise about the first member via a member pivot, the second member configured to receive a pedal at a pedal interface;
   a spring to bias the second member toward a default orientation relative to the first member when the second member pivots clockwise relative to the first member and to bias the second member toward the default orientation relative to the first member when the second member pivots counterclockwise relative to the first member; and
   a rotary sensor coupled to the first member, the rotary sensor configured to measure rotation of the second member relative to the first member.

2. The crank assembly of claim 1, wherein the rotary sensor includes a sensor gear and the crank assembly further comprises an arc gear coupled to the second member, the arc gear configured to cause rotation of the sensor gear responsive to the second member rotating relative to the first member.

3. The crank assembly of claim 2, wherein rotation of the sensor gear is mechanically amplified by the arc gear.

4. The crank assembly of claim 2, wherein the sensor gear rotates about an axle, and wherein the arc gear engages the sensor gear between the axle and the crank axis.

5. The crank assembly of claim 2, wherein the arc gear includes a shield that covers the sensor gear.

6. The crank assembly of claim 1, wherein the member pivot is a first member pivot and the crank assembly further comprising:
   a third member that rotates about the crank axis of the pedal-driven vehicle; and
   a fourth member rotationally coupled to the third member and configured to pivot about the third member via a second member pivot, the fourth member configured to receive a pedal at a pedal interface.

7. The crank assembly of claim 6, wherein the rotary sensor is a first rotary sensor, the crank assembly further comprising: a second rotary sensor coupled to the third member.

8. The crank assembly of claim 7, further comprising a controller coupled to the first member and communicatively coupled to the first rotary sensor, the controller also communicatively coupled to the second rotary sensor via a wiring path between the first member and the third member.

9. The crank assembly of claim 8, wherein the controller is configured to derive an angular velocity of the first and second crank arms from torque measurements of the first and second rotary sensors.

10. The crank assembly of claim 7, further comprising a power source coupled to the first member and communicatively coupled to the first rotary sensor, the power source also communicatively coupled to the second rotary sensor via a wiring path between the first member and the third member.

11. The crank assembly of claim 1, wherein the first member includes an enclosure and the rotary sensor includes a sensing element positioned inside the enclosure.

12. The crank assembly of claim 11, further comprising a controller positioned inside the enclosure and communicatively coupled to the rotary sensor, the controller configured to provide output derived from rotary sensor output.

13. The crank assembly of claim 11, further comprising a power source positioned inside the enclosure.

14. The crank assembly of claim 11, further comprising a wireless transceiver positioned inside the enclosure.

* * * * *